INVENTOR.
JAMES M. BOOE
ATTORNEY

Jan. 3, 1967  J. M. BOOE  3,296,500
ELECTROLYTIC CAPACITOR WITH NIOBIUM ANODE AND
DEPOLARIZER IN THE ELECTROLYTE
Filed June 10, 1963  2 Sheets-Sheet 2

INVENTOR.
JAMES M. BOOE
BY
ATTORNEY

United States Patent Office 3,296,500
Patented Jan. 3, 1967

3,296,500
ELECTROLYTIC CAPACITOR WITH NIOBIUM ANODE AND DEPOLARIZER IN THE ELECTROLYTE
James M. Booe, Indianapolis, Ind., assignor to P. R. Mallory & Co., Inc., Indianapolis, Ind., a corporation of Delaware
Filed June 10, 1963, Ser. No. 286,678
16 Claims. (Cl. 317—230)

This invention relates to electrolytic capacitors and has specific pertinence to a capacitor having an anode of niobium and means for depolarization of the cathode.

The metal niobium has the characteristic of forming an oxide film on its surface when subjected to anodic treatment, said film possessing an asymmetrically conducting property in the presence of an electrolyte. Niobium is unlike other film-forming metals such as titanium in that the dielectric constant of its oxide film is outstandingly high. For niobium oxide, $K=41$, as compared to 28 for tantalum oxide. Accordingly, niobium offers distinct advantages for capacitor applications. The relatively low density (8.6 grams/cc.), low cost, and ready availability of niobium make it further attractive for capacitor use.

Heretofore, the utility of niobium as a capacitor electrode was limited by the inherently high leakage current of its dielectric oxide film. The high leakage current of the niobium oxide film contributes to reduced operating life of the capacitor, increased dissipation factor, and decreased capacitance because of the hydrogen gas liberated at the cathode. Furthermore, because approximately 0.4 milliliters of hydrogen gas will be liberated at the cathode for each milliampere—hour of D.C. leakage current flowing through the capacitor, venting means are often necessary in high voltage applications of a niobium capacitor.

By the present invention, a means has been found to overcome the effects of the higher leakage current of a niobium oxide film. Accordingly, a niobium electrolytic capacitor having superior electrical properties is herein disclosed. By the use of a cathode of the "plateable metal" type such as silver or copper, coupled with the respective ions of such metal disposed within the electrolyte, the liberation of hydrogen gas at the cathode is obviated, and the electrical properties of the niobium capacitor are greatly improved. Furthermore, by introducing into the electrolyte an excess of the salt of the cathode metal beyond the amount required for saturation, a reservoir for the metal ions is provided. Thus, the undissolved salt will serve as a reservoir for the silver or copper ions as these ions are liberated from the electrolyte solution and deposited onto the cathode as a result of the leakage current flowing through the capacitor. While this leakage current flows, the metal ions will deposit on the cathode in preference to the liberation of hydrogen gas. Thus the possibility of excessive pressure generation is circumvented and the capacitor may be tightly sealed. The need for a special gas venting device, as commonly employed in electrolytic capacitors, is herein obviated, and the capacitor construction is accordingly simplified.

The use of these plateable metal ions will not only prevent the deleterious gas pressure effects caused by the leakage current, but will also enhance the dynamic electrical properties of the capacitor. That is to say, when an alternating current is superimposed on the direct current, the electrical losses are minimized and the full capacitance of the anode is exhibited. This is due to the fact that capacitors of this type operate on the principle of electrolytically dissolving silver or copper from the cathode when current is flowing through the unit in one direction and electrolytically depositing silver or copper on the cathode from ions in the electrolyte when current is flowing through the unit in the opposite direction. This dissolution and deposition of ions of the cathode metal precludes the formation of gas films, corrosion films, and asymmetric conducting films on the cathode, thereby preventing or minimizing losses and other electrical changes in the capacitor.

It is an object of the present invention, therefore, to provide an electrolytic capacitor having an anode of niobium wherein means are provided to overcome the effects of leakage current.

It is another object of the present invention to provide a niobium electrolytic capacitor having a large amount of depolarizer material present therein both in solid form as well as dissolved in the electrolyte.

Yet another object of the present invention is to provide a niobium electrolytic capacitor having a large amount of depolarizer material present therein both in gelled form as well as dissolved in the electrolyte.

A further object of the present invention is to provide an electrolytic capacitor comprising an anode of niobium, a cathode of silver or copper, an electrolyte, a suitable depolarizer dissolved in said electrolyte, and a pressed body of said depolarizer in contact with said electrolyte.

Yet another object of the present invention is to provide a niobium electrolytic capacitor of novel character which may be built in extremely small dimensions with relatively high capacitances values and which may be readily manufactured and sold on a practical and commercial scale at low cost.

Still another object of the present invention is to provide a niobium electrolytic capacitor wherein the undesirable liberation of hydrogen gas is prevented and the unit can therefore be tightly sealed. Special venting devices are unnecessary herein.

Yet another object of the present invention is to provide a niobium electrolytic capacitor having minimum electrical losses when an alternating current is superimposed on the direct current therein.

Still another object of the present invention is to obtain maximum capacitor efficiency by enabling the anode to exhibit its maximum capacitance while the resistance at the cathode-electrolyte junction is reduced to a minimum.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the present invention and the nature thereof will become apparent from the following description considered in connection with the accompanying figures of the drawing and wherein like reference characters describe elements of similar function therein and wherein the scope of the invention is determined rather from the dependent claims.

Figure 4:
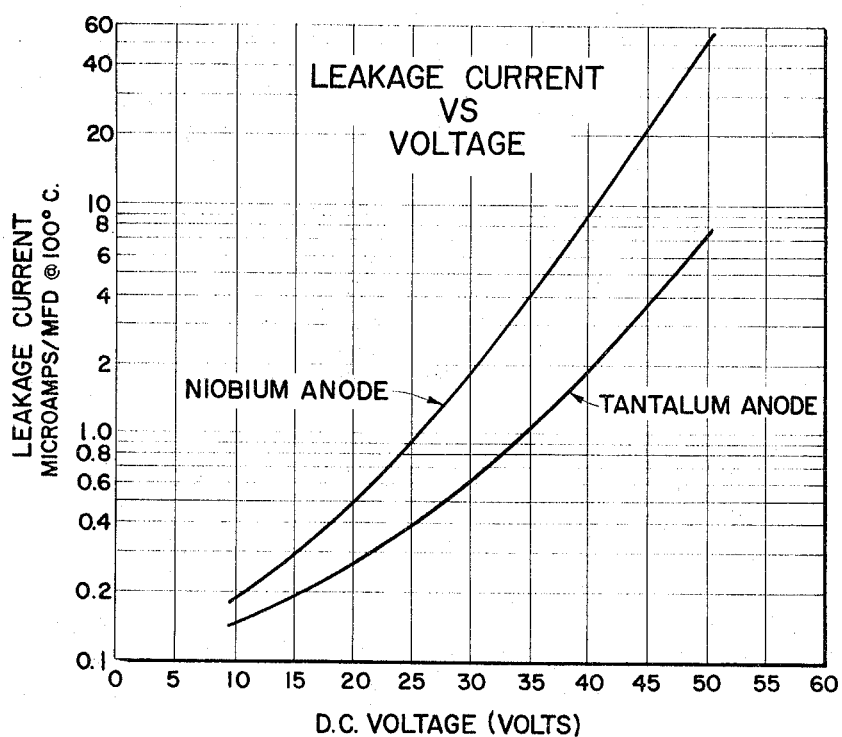

FIGURE 4 presents a graphical comparison of leakage currents obtained with tantalum oxide and niobium oxide dielectric films.

Generally speaking, the present invention provides the means and method for overcoming the effect of higher leakage current in a capacitor having a niobium anode. In combination with a silver or copper cathode, an electrolyte of sulfuric acid is saturated with a depolarizer of silver sulfate or copper sulfate, respectively, and an additional quantity of undissolved depolarizer material is provided therein. Thus, a substantial portion of the depolarizer remains in solid form and is available for replenishing the electrolyte with ions of the cathode metal whenever the concentration of such ions in the electrolyte decreases below the saturation point.

The use of a solid depolarizer of silver sulfate or copper sulfate is especially advantageous in electrolytic capacitors wherein the anode area is many times greater than the cathode area and the cell construction is of the tightly sealed type. Under these conditions, if no depolarizer were present, the inherent electrolytic leakage current would cause hydrogen gas to be evolved on the cathode surface at the rate of 0.4 ml. per ma.-hr. This would produce a greater pressure within the cell than could be tolerated. The provision of a solid depolarizer, such as the sulfate of the cathode metal, not only stabilizes the capacitance and the equivalent series resistance of the capacitor, but, in addition, it serves to prevent the liberation of hydrogen gas by the electrolytic leakage current. Instead, metallic silver or copper is deposited on the silver or copper cathode, respectively, in amounts equivalent to the electrolytic leakage current according to Faraday's Law. For example, 4.025 grams of silver are deposited on the cathode per 1000 milliampere-hours of leakage current. In a hypothetical case, therefore, where the leakage current of a capacitor is 100 microamperes, approximately 1 gram of silver would be required to provide depolarization for 2500 hours of operation. This amount of silver would represent an average silver deposit thickness of 0.006 inch on a cathode having 1 square inch of surface area.

Silver and copper sulfate are slightly soluble in the sulfuric acid electrolyte to respectively produce silver or copper ions in the solution. When these ions are liberated on the cathode in the metallic form, a corresponding amount of the solid cathode metal sulfate dissolves in the electrolyte to replenish the same with more cathode metal ions. Instead of silver sulfate, silver oxide, and instead of copper sulfate, copper oxide, may also be used as the depolarizing material. In use, the oxides react with the sulfuric acid to form a saturated solution of the sulfate of the cathode metal.

The solid cathode metal sulfate may be incorporated in the capacitor cell by merely adding it as powder or crystalline material to the electrolyte in sufficient quantity as to exceed its solubility in the electrolyte, thus leaving free depolarizer in solid form dispersed throughout the electrolyte. The amount added may even be great enough to produce a slurry with the electrolyte. In this case, there is sufficient excess of depolarizer present at all times to serve as a substantial reservoir, enabling the capacitor to operate for a longer period of time.

In another form of the present invention, the depolarizer is held in place by means of a gelling technique. This provides a uniform concentration of depolarizer over the cathodic surface, and is especially advantageous in miniaturized capacitor constructions.

In yet another form of the invention, the depolarizer material, such as the sulfate or oxide of the cathode metal, may be pressed into the bottom of the container which constitutes the cathode of the capacitor. It has been found, however, that the depolarizer should not be pressed into the cathode container to an excessively high pressed density; otherwise, the pressed body of depolarizer particles will not be sufficiently permeable to the electrolyte. It has been found that, in order to enable adequate electrolyte permeation, the pressed density for either silver sulfate or copper sulfate should not be greater than 2.5 grams per cc.

As an added precaution, to prevent possible short circuits between the cathode container and the anode by the growth of cathode metal from the cathode, an ionically permeable porous barrier layer may be interposed between the anode and the cathode, preferably next to the anode. Barrier materials inert to the sulfuric acid electrolyte, such as microporous rubber, microporous vinyl films, asbestos paper, and the like have been found to be effective.

Figure 1:
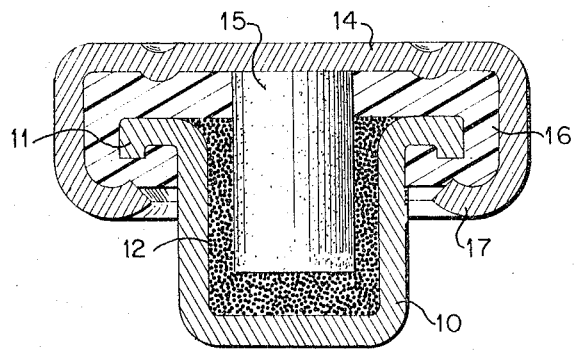
FIGURE 1 represents a vertical cross sectional elevation view, at an enlarged scale, of a niobium electrolytic capacitor wherein the electrolyte contains an excess of a salt of the cathode metal as a depolarizer.

Referring now to FIGURE 1 of the drawing, illustrating one embodiment of the invention, reference numeral 10 denotes a casing of silver or copper constituting the cathode of the capacitor, said casing being closed at one end and having a flange 11 at its other end.

The anode structure of the capacitor comprises a top 14 of niobium sheet, to the inner face of which there is secured in any suitable manner, such as by projection welding, niobium pellet 15 constituted by a pressed and sintered body of niobium powder and having a dielectric film formed thereon in the usual manner. The density of niobium metal is approximately one-half that of tantalum. The niobium anode assembly is insulated from cathode or casing 10 by means of an interposed gasket 16 fabricated of a material suitable from the standpoint of corrosion resistance and high temperature characteristics, for example, a tetrafluoroethylene polymer. The circumferential marginal portions of top 14 are crimped down over gasket 16, as indicated at 17, constituting therewith a sealed enclosure for the capacitor.

Between niobium anode 15 and its associated cathode 10, there is interposed an electrolyte 12, herein stated as being sulfuric acid. Within electrolyte 12 is dispersed a salt of the metal employed in cathode 10. Said salt, which constitutes the depolarizer material, is added in an amount beyond that required for saturation and the excess resides in solid form, producing a slurry as shown in FIGURE 1. If cathode 10 is composed of silver, an excess of silver sulfate is added to the electrolyte. Whereas, if cathode 10 is composed of copper, an excess of copper sulfate is added to the electrolyte. When during the operation of the capacitor, cathode metal is deposited on cathode 10, a corresponding amount of sulfate of such metal is dissolved from the slurry to replenish the electrolyte with ions of the cathode metal.

With continued reference to FIGURE 1, electrolyte 12 may be initially in the free-flowing condition, after which the addition of excess depolarizer forms a slurry. It has been found, however, that immobilization of the electrolyte itself will aid in maintaining the depolarizer material distributed over the cathodic surface. In such a case, a thickening or immobilizing agent, which is not adversely affected by the electrolyte, is added thereto. An example of an effective agent is silica powder of a sub-micron particle sizle. The addition of 2% to 3% of this agent has a pronounced effect in immobilizing the electrolyte.

Immobilization of electrolyte 12 may be effected in another manner. The entire volume of electrolyte 12, including that within the pores of anode 15, may be immobilized by means of a gelling agent such as ethyl ortho-silicate. Prior to inserting anode 15, the gelling agent is added to the sulfuric acid containing the excess depolarizer. Upon standing, the electrolyte becomes solidified due to the formation of a silicic acid gel. Potassium silicate or sodium silicate are also effective gelling agents, but the gel formation period thereof is rather short as compared to that of ethyl ortho-silicate.

Figure 2:
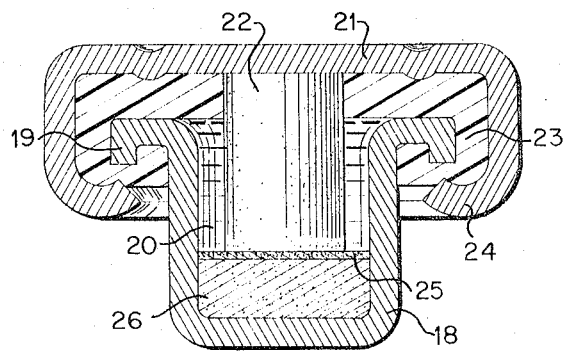
FIGURE 2 represents a vertical cross sectional elevation view, at an enlarged scale, of a niobium electrolytic capacitor wherein a salt of the cathode metal is pressed in the bottom of the container as a depolarizer.

FIGURE 2 illustrates a second embodiment of the present invention wherein a pressed depolarizer body 26 is employed in place of the dispersed depolarizer particles of FIGURE 1. Depolarizer body 26 is formed by compressing silver sulfate or copper sulfate particles in the bottom of cathode or casing 18. An ionically permeable barrier layer 25 is interposed between nobium anode pellet 22 and depolarizer body 26 to prevent accidental short circuits. The remaining space within casing 18 is filled with sulfuric acid electrolyte 20, such electrolyte being substantially saturated with the sulfate of the cathode metal. Depolarizer body 26 serves to replenish electrolyte 20 with ions of cathode metal during capacitor operation. The remainder of the capacitor construction in FIGURE 2 and the method of sealing the unit is the same as heretofore described in connection with FIGURE 1.

Figure 3:
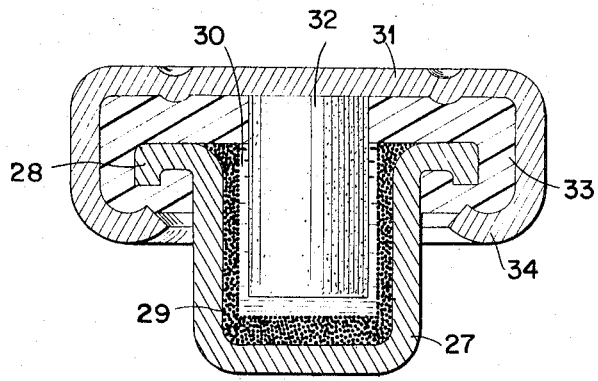
FIGURE 3 represents a vertical cross sectional elevation view, at an enlarged scale, of a niobium electrolytic capacitor wherein a salt of the cathode metal lines the cathodic surface and is suspended in gel form.

A third embodiment of the present invention is illustrated in FIGURE 3. In this embodiment, the depolarizer is held in place by means of a gelling technique, thereby assuring a uniform concentration of depolarizer over the surface of the cathode. Such a technique is particularly advantageous where the anode and cathode are closely spaced and where the maxmium amount of depolarizer is to be employed.

With reference to FIGURE 3, the assembly procedure to be followed with the gelling technique consists initially of molding the silver sulfate or copper sulfate depolarizer 29 as a lining within cathode container 27, while leaving a cavity into which anode 32 may be later inserted and allowing for the addition of electrolyte 30. Within the molded depolarizer 29 is incorporated a gelling agent which will solidify upon contact with the sulfuric acid electrolyte 30. Examples of suitable gelling agents are sodium silicate, potassium silicate, and ethyl silicate, each of which will form a silicic acid gel upon contact with sulfuric acid, thereby holding the depolarizer uniformly over the cathodic surface.

Each of the respective methods of introducing excess depolarizer disclosed in FIGURES 1, 2, and 3 of the drawing has applicability. In practice, the choice of method would depend upon the geometry of the cell construction and the specific application for which the device is intended.

FIGURE 4 of the drawing presents a direct comparison, in graphical form, of the respective leakage currents experienced with tantalum oxide and niobium oxide dielectric films. From these curves, therefore, it can readily be seen that the principal means for enhancing the operation of a niobium electrolytic capacitor lies in the ability to overcome the effects of high leakage current. The data of FIGURE 4 was obtained in the following manner. A niobium anode and a tantalum anode of identical physical dimensions were formed simultaneously in 25% sulfuric acid at 105° C. for approximately 1 hour. At the end of formation, the total leakage current was about 1 milliampere. Leakage current measurements were then made on each anode at a temperature of 100° C. in the same electrolyte. Because the tantalum anode was made from finer particle size powder than that of the niobium anode, the former exhibited greater capacitance, viz., 13.1 mfd. compared to 10.8 mfd. for niobium. For accurate comparison in the curves of FIGURE 4, therefore, leakage current is expressed in microamperes per microfarad. Although the leakage current levels would be substantially reduced at lower temperatures, the relationship between niobium and tantalum is representative as presented.

In order to clearly illustrate the marked improvement in performance of a niobium electrolytic capacitor when provided with depolarization according to the present invention, the following examples of test results are presented herein.

*Example 1*

A small niobium anode was electro-formed to 70 volts in 30% sulfuric acid at 100° C. and measurements were made in this same electrolyte at room temperature. The electrolyte was then saturated with silver sulfate plus an excess of the salt, and the measurements were repeated. The comparison is presented, as follows:

| A.C. Measuring Voltage (volts) | Capacitance (mfd.) | | Equivalent Series Resistance (ohms) | |
|---|---|---|---|---|
| | Without Depolarizer | With Depolarizer | Without Depolarizer | With Depolarizer |
| 0.05 | 27 | 37 | 7.7 | 2.5 |
| 0.1 | 30 | 37 | 5.6 | 2.5 |
| 0.5 | 33 | 37 | 4.9 | 2.5 |

*Example 2*

A larger niobium anode was electro-formed to 10 volts in 39% sulfuric acid at 90° C. Measurements were made in this same electrolyte at room temperature with the anode positioned in a silver cathode container of the proper size to contain the anode and the electrolyte. The electrolyte was then saturated with silver sulfate plus an excess of the salt, and the measurements were repeated. The comparison is presented, as follows:

| A.C. Measuring Voltage (volts) | Capacitance (mfd.) | | Equivalent Series Resistance (ohms) | |
|---|---|---|---|---|
| | Without Depolarizer | With Depolarizer | Without Depolarizer | With Depolarizer |
| 0.03 | 35 | 250 | 9.5 | 1.7 |
| 0.3 | 114 | 265 | 3.6 | 1.5 |
| 1.0 | 205 | 265 | 2.1 | 1.4 |

*Example 3*

The same anode of Example 2 was used with a copper cathode having an area equivalent to the area of the silver cathode. This test was conducted in the same manner, with the initial room temperature measurements being taken in 39% sulfuric acid. The electrolyte was then saturated with copper sulfate plus an excess of the salt, and the measurements were repeated. The comparison is presented, as follows:

| A.C. Measuring Voltage (volts) | Capacitance (mfd.) | | Equivalent Series Resistance (ohms) | |
|---|---|---|---|---|
| | Without Depolarizer | With Depolarizer | Without Depolarizer | With Depolarizer |
| 0.03 | 42 | 212 | 10.2 | 3.6 |
| 0.3 | 108 | 245 | 4.6 | 2.6 |
| 1.0 | 250 | 272 | 2.05 | 0.85 |

Examination of the data presented in Examples 1, 2, and 3 above, will reveal the remarkable stability of capacitance and equivalent series resistance brought about by use of the depolarizer. This stability is attributed to the high capacitance exhibited at the cathode when the depolarizer is present. "Electrolyte double layer" is the term used by those skilled in the art to describe the cathodic formation which accounts for this high capacitance. When silver or copper ions are present in the electrolyte to dissolve and redeposit with the flow of alternating current, the electrolyte double layer is not disturbed. However, if gas evolution or other deleterious reaction takes place at the cathode with the flow of alternating current, the electrolyte double layer is thereupon disturbed and a much lower capacitance is realized. Accordingly, in the absence of a depolarizer, a low capacitance is exhibited at the cathode.

Through the use of actual experimental values, it will be shown mathematically that, if a very high capacitance is exhibited at the cathode, the anode or the device will exhibit a capacitance value at or near its maximum. Using a silver cathode in a 39% sulfuric acid solution with no depolarizer present, a capacitance of 1008 mfd.

per sq. in. was obtained at 0.3 volt A.C. measuring voltage. When silver sulfate depolarizer was present in the same electrolyte in a saturated condition, the cathodic capacitance became 14,220 mfd. per sq. in. of silver surface.

The arithmetic summation of capacitance values in series is expressed by the following equation:

$$\frac{1}{C} = \frac{1}{C_1} + \frac{1}{C_2}$$

where $C_1$ is the capacitance of the anode, $C_2$ is the capacitance of the cathode, and $C$ is the capacitance of the device. By assuming an anode having a 1000 mfd. capacitance and a 1 sq. in. silver cathode having the 1008 mfd. capacitance value experimentally determined, $C$ for the device which contained no depolarizer would be essentially 500 mfd., or half the capacitance of the respective electrodes.

Again assuming a value of 1000 mfd. for $C_1$, and a 1 sq. in. silver cathode, if the electrolyte is saturated with silver sulfate depolarizer, the experimental value of 14,220 mfd. now becomes applicable for $C_2$. The resulting $C$ for the device is therefore 935 mfd., as compared to the $C$ of 500 mfd. without depolarizer. Hence, it is apparent that the high capacitance of the cathode exhibited in the presence of a depolarizer will not substantially change the capacitance of the anode or that of the device. However, the lower capacitance of the anode exhibited in the absence of a depolarizer is seen to seriously diminish the overall capacitance of the device.

From the foregoing test results, therefore, it is evident that a reservoir of cathode metal ions within the electrolyte serves to greatly improve the electrical characteristics of a capacitor having a niobium anode. By the means and method of the present invention, therefore, it has become possible to utilize the higher dielectric constant of niobium in a manner whereby the effects of its inherently higher leakage current are overcome.

In the capacitor constructions taught by the present invention, it has been found that the metallic deposits formed on the cathode during operation tend to grow preferentially on any slight projections which may be present on the cathodic surface. When these preferential deposits reach the anode, a short circuit results. In miniaturized capacitors where the anode and cathode are very closely spaced, this dendritic growth becomes an acute problem.

Where the cathode metal is copper, the addition of certain grain refining agents or brightening agents to the electrolyte has proven effective in controlling the nature of the copper deposits. These agents afford a smooth deposit of copper while obviating preferential or dendritic growth thereof. Examples of such additives and their preferred concentrations are as follows:

Glue, about 25 parts per million.
Goulac, a resinous by-product of paper refining, about 0.1%.
Molasses, about 0.1%.
Dextrose, about 0.1%.
Phenol sulfonic acid, about 0.1%.
Thiourea, about 0.001%.

Where the cathode metal is silver, however, a different means of controlling the plating deposits is undertaken. This is because an effective brightening agent has not been discovered which can be added to the electrolyte to cause smooth deposition of silver. It has been found that, with the use of a smooth, bright cathode and a silver sulfate depolarizer, the smoothness of the resulting silver deposit is greatly improved. Thus, by improving the surface finish of the cathode and eliminating projections which might encourage preferential growth, acceptable uniformity of silver deposition can be obtained.

Surface brightening of the silver cathode is therefore conducted prior to assembly of the capacitor unit. This is accomplished either by applying chemical bright-dip to the cathodic surface, or by subjecting the surface to electropolishing. One effective bright-dip composition is sodium cyanide plus hydrogen peroxide, while another is ammonium hydroxide plus hydrogen peroxide. The former bright-dip solution contains 4 ounces per gallon of NaCN and 5 fluid ounces per gallon of a 35% solution of $H_2O_2$. It is applied at room temperature.

An effective electropolishing process for surface brightening of the silver cathode employs a solution of silver cyanide, potassium cyanide, and potassium carbonate, wherein the silver cathode is made anodic to produce a deplating action. The composition of this solution is as follows: 40 grams per liter of AgC; 20 grams per liter of free KC; and 40 grams per liter of $K_2CO_3$. For polishing, the silver cathode is made anodic at a current density of 25 to 35 amperes per sq. ft. Each of the above compositions and treatments will impart a high degree of brightness to the silver cathode surface, and, in some cases, a mirror finish is approached.

In capacitors embodying the present invention, the concentration range for the sulfuric acid electrolyte may vary between 5% and 75%. Although the preferred operating concentration is 39%, allowance must be made for the formation of sulfuric acid as the depolarizer is consumed. As silver or copper is deposited on the cathode, the respective sulfate combines with the hydrogen ions to form more sulfuric acid. Since it is necessary to start with a lower concentration in order to compensate for this buildup, the preferred initial range of acid concentration is therefore 20% to 30%.

When employing copper sulfate as the solid depolarizer, either its anhydrous form ($CuSO_4$), or its hydrated form ($CuSO_4 \cdot 5H_2O$), may be used. There is, however, some advantage in the use of the hydrated form in that, as copper is plated from the solution, the increasing concentration of sulfuric acid is offset by the liberation of water from the salt. This, of course, is not the case when the anhydrous copper sulfate is used. It is also possible to use cuprous sulface ($Cu_2SO_4$) as the solid depolarizer, although it is not as satisfactory as cupric sulfate due to its relatively low solubility and unstable nature.

The niobium electrolytic capacitor of the present invention as hereinbefore described in several of its embodiments, is merely illustrative and not exhaustive in scope. Since many widely different embodiments of the invention may be made without departing from the scope thereof, it is intended that all matter contained in the above description and shown in the accompnaying drawings shall be interposed as illustrative and not in a limiting sense.

What is claimed is:
1. An electrolytic capacitor comprising, in combination, a niobium anode having a dielectric film thereon, a cathode of a metal selected from the group consisting of copper and silver, an electrolyte of sulfuric acid having a concentration between 5% and 75% and being substantially saturated with ions of the cathode metal in contact with said anode and cathode, and a compound of the cathode metal in solid form in contact with said electrolyte, said compound being soluble in the electrolyte and being adapted to maintain the concentration of ions of the cathode metal therein at saturation during the operative life of the capacitor.

2. An electrolytic capacitor comprising, in combination, a film forming anode of niobium, a cathode of a metal selected from the group consisting of copper and silver, an electrolyte of sulfuric acid substantially saturated with ions of the cathode metal interposed between and in contact with said anode and cathode, and a solid depolarizer of an oxide of the cathode metal in contact with said electrolyte adapted to maintain the concentration of ions of the cathode metal therein at saturation during the operative life the capacitor.

3. An electrolytic capacitor comprising, in combination, an anode of niobium having a dielectric film formed thereon, a cathode of a metal selected from the group consisting of copper and silver, an electrolyte of sulfuric acid substantially saturated with the sulfate of the cathode metal, and a gelled body of a solid depolarizer composed of the sulfate of the cathode metal soluble in said electrolyte and a gelling agent selected from the group consisting of silica, ethyl silicate, sodium silicate and potassium silicate, said gelled body being contiguous with said cathode and having a central cavity occupied by said anode and said electrolyte and maintaining a uniform concentration of depolarizer over the surface of said cathode, and said gelled body being adapted to maintain the concentration of ions of the cathode metal in the electrolyte at saturation during the operative life of the capacitor.

4. An electrolytic capacitor comprising, in combination, a casing having an inner surface of a metal selected from the group consisting of copper and silver constituting the cathode of the capacitor, an anode of niobium in said casing and spaced therefrom, an electrolyte of sulfuric acid substantially saturated with the sulfate of the cathode metal interposed between said cathode and anode, an a porous body of a solid compound of the cathode metal soluble in said electrolyte in contact with the cathode and said electrolyte but spaced from said anode adapted to maintain the concentration of ions of the cathode metal in the electrolyte at saturation during the operative life of the capacitor.

5. An electrolytic capacitor comprising, in combination, a casing of silver constituting the cathode of the capacitor, a body of a solid silver compound selected from the group consisting of silver oxide and silver sulfate compressed in the bottom of said casing, said compressed body having a density not greater than 2.5 gms./cc., an anode of niobium having a dielectric film formed thereon in said casing and spaced therefrom and from said body of silver compound, and an electrolyte of sulfuric acid substantially saturated with silver ions filling out the casing, said solid silver compound being present in an amount sufficient to maintain the electrolyte in the saturated condition during the operative life of the capacitor.

6. An electrolytic capacitor as claimed in claim 5, wherein the density of the compressed body of silver compound does not exceed about 2.5 gms./cc.

7. An electrolytic capacitor comprising, in combination, a casing of copper constituting the cathode of the capacitor, a body of a solid copper compound selected from the group consisting of copper oxide and copper sulfate compressed in the bottom of said casing, an anode of niobium having a dielectric film formed thereon in said casing and spaced therefrom and from said body of copper compound, and an electrolyte of sulfuric acid substantially saturated with copper ions filling out the casing, said solid copper compound being present in an amount sufficient to maintain the electrolyte in the saturated condition during the operative life of the capacitor.

8. An electrolytic capacitor as claimed in claim 7, wherein the solid copper compound is hydrated copper sufate.

9. An electrolytic capacitor as claimed in claim 7, wherein the density of the compressed body of copper compound does not exceed about 2.5 gms./cc.

10. An electrolytic capacitor comprising, in combination, a casing of a metal selected from the group consisting of copper and silver constituting the cathode of the capacitor, a solid depolarizer body composed of the sulfate of the cathode metal compressed in the bottom of said casing, a porous anode of niobium having a dielectric film formed thereon in said casing and spaced therefrom and from said body of sulfate, an electrolyte of sulfuric acid substantially saturated with ions of the cathode metal filling out said casing, and an ionically permeable barrier layer interposed between said anode and said depolarizer body, said solid sulfate of the cathode metal being present in an amount sufficient to maintain the electrolyte in the saturated condition during the operative life of the capacitor.

11. An electrolytic capacitor comprising, in combination, a casing of a metal selected from the group consisting of copper and silver constituting the cathode of the capacitor, a porous anode of niobium within said casing having a dielectric film formed thereon, a metal top cover and terminal plate to which said anode is secured, an insulative gasket compressed between cooperating marginal portions of said casing and said top cover plate and constituting therewith a sealed enclosure for the capacitor, an electrolyte of sulfuric acid substantially saturated with ions of the cathode metal filling out said enclosure, and a substantial excess of solid particles of the sulfate of the cathode metal being present within said electrolyte to maintain the concentration of said ions at saturation during the operative life of the capacitor.

12. An electrolytic capacitor comprising, in combination, a casing of a metal selected from the group consisting of copper and silver constituting the cathode of the capacitor, a solid depolarizer body composed of the sulfate of the cathode metal compressed in the bottom of said casing, an anode in the form of a porous body of pressed and sintered niobium powder in said casing and having a dielectric film formed thereon, a metal top cover plate to which said anode is secured, an insulative gasket compressed between cooperating marginal portions of said casing and said top cover plate and constituting therewith a sealed enclosure for the capacitor, an electrolyte of sulfuric acid substantially saturated with ions of the cathode metal filling out said enclosure, and an ionically permeable barrier layer interposed between said anode and said depolarizer body, said solid sulfate of the cathode metal being present in an amount sufficient to maintain the electrolyte in the saturated condition during the operative life of the capacitor.

13. An electrolytic capacitor comprising, in combination, a casing of a metal selected from the group consisting of copper and silver constituting the cathode of the capacitor, a porous anode of niobium within said casing having a dielectric film formed thereon, a metal top cover and terminal plate to which said anode is secured, an insulative gasket compressed between cooperating marginal portions of said casing and said top cover plate and constituting therewith a sealed enclosure for the capacitor, an electrolyte of sulfuric acid substantially saturated with ions of the cathode metal filling out said enclosure, and a gelled body of solid depolarizer composed of the sulfate of the cathode metal and a gelling agent selected from the group consisting of silica, ethyl ortho-silicate, sodium silicate and potassium silicate contiguous with said cathode and said electrolyte and maintaining a uniform concentration of depolarizer over the surface of said cathode, said gelled body being adapted to maintain the concentration of said ions in said electrolyte at saturation during the operative life of the capacitor.

14. An electrolytic capacitor comprising, in combination, an anode of porous niobium having a dielectric film formed thereon, a cathode of a metal selected from the group consisting of copper and silver, an electrolyte of sulfuric acid substantially saturated with the sulfate of the cathode metal interposed between and in contact with said anode and cathode, and an excess of said sulfate in contact with said electrolyte in an amount sufficient to maintain the electrolyte in the saturated condition during the operative life of the capacitor, said cathode being capable of responding to the flow of current through the capacitor in one direction by the dissolution of cathode metal in the electrolyte and of responding to the flow of current through the capacitor in the opposite direction by the deposition of cathode metal from the electrolyte.

15. An electrolytic capacitor comprising, in combination, a film forming anode of niobium, a cathode of copper, an electrolyte of sulfuric acid substantially saturated with copper ions interposed between and in contact with said anode and cathode, a solid depolarizer of a sulfate of copper in contact with said electrolyte adapted to maintain an adequate concentration of copper ions therein, and a small quantity of a grain refining agent dissolved in said electrolyte, said solid sulfate of copper being present in an amount sufficient to maintain the electrolyte in the saturated condition during the operative life of the capacitor.

16. An electrolytic capacitor comprising, in combination, a film forming anode of niobium, a casing of silver constituting the cathode of the capacitor, the inner surface of said casing being polished to remove substantially all imperfections thereon, an electrolyte of sulfuric acid substantially saturated with silver ions interposed between said anode and cathode, and a solid depolarizer of the sulfate of silver in contact with said electrolyte adapted to maintain an adequate concentration of silver ions therein, said solid sulfate of silver being present in an amount sufficient to maintain the electrolyte in the saturated condition during the operative life of the capacitor.

References Cited by the Examiner

UNITED STATES PATENTS

| | | | |
|---|---|---|---|
| 2,778,979 | 1/1957 | Booe | 317—230 |
| 2,871,426 | 1/1959 | Hilton et al. | 317—230 |

FOREIGN PATENTS

| | | |
|---|---|---|
| 150,833 | 4/1904 | Germany. |
| 511,805 | 8/1939 | Great Britain. |

JAMES D. KALLAM, *Primary Examiner.*